(12) United States Patent
Cook et al.

(10) Patent No.: US 11,188,543 B2
(45) Date of Patent: Nov. 30, 2021

(54) UTILIZING SOCIAL INFORMATION FOR RECOMMENDING AN APPLICATION

(71) Applicant: International Business Machines Corporation, Armonk, NY (US)

(72) Inventors: Kelly L. Cook, Raleigh, NC (US); Lydia M. Do, Raleigh, NC (US); Eileen Min, Durham, NC (US); Eric Woods, Durham, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 856 days.

(21) Appl. No.: 14/053,395

(22) Filed: Oct. 14, 2013

(65) Prior Publication Data

US 2015/0106350 A1    Apr. 16, 2015

(51) Int. Cl.
  *G06F 16/00*      (2019.01)
  *G06F 16/2457*   (2019.01)
  *G06F 16/951*    (2019.01)

(52) U.S. Cl.
  CPC ...... *G06F 16/24578* (2019.01); *G06F 16/951* (2019.01)

(58) Field of Classification Search
  None
  See application file for complete search history.

(56) References Cited

U.S. PATENT DOCUMENTS

| | | | | |
|---|---|---|---|---|
| 8,091,032 | B2* | 1/2012 | Fischer | 715/751 |
| 8,095,432 | B1* | 1/2012 | Berman | G06Q 10/10 705/26.7 |
| 8,230,016 | B1 | 7/2012 | Pattan et al. | |
| 8,255,280 | B1 | 8/2012 | Kay et al. | |
| 8,285,840 | B2 | 10/2012 | Dobroth et al. | |
| 8,694,401 | B2 | 4/2014 | Stewart | |
| 9,372,878 | B2* | 6/2016 | van Hoff | G06F 17/3053 |
| 2005/0278325 | A1 | 12/2005 | Mihalcea | |
| 2006/0015722 | A1* | 1/2006 | Rowan | H04L 63/0823 713/166 |

(Continued)

FOREIGN PATENT DOCUMENTS

| | | |
|---|---|---|
| CN | 102317903 B | 1/2012 |
| CN | 102902717 A | 1/2013 |

(Continued)

OTHER PUBLICATIONS

Lim et al., "Recommendation Algorithm of the App Store by Using Semantic Relations between Apps", UCMA 2011, Part II, CCIS 151, pp. 139-144, 2011, Springer-Verlag Berlin Heidelberg.*

(Continued)

*Primary Examiner* — Tyler J Torgrimson (74) *Attorney, Agent, or Firm* — Fabian VanCott; Steven L. Nichols (57) ABSTRACT

Utilizing social information for recommending an application includes providing an application recommendation system based on social characterizations, and responsive to a user searching for an application meeting a criteria, utilizing the application recommendation system by searching for applications meeting the criteria, characterizing the applications according to a social proximity factor to the user, and presenting the applications ordered by the social proximity factor.

14 Claims, 7 Drawing Sheets

(56) References Cited

U.S. PATENT DOCUMENTS

| | | |
|---|---|---|
| 2009/0234814 A1 | 9/2009 | Boerries |
| 2010/0250337 A1 | 9/2010 | Kassaei |
| 2010/0306762 A1 | 12/2010 | Lindberg et al. |
| 2011/0029408 A1 | 2/2011 | Shusterman et al. |
| 2012/0116905 A1* | 5/2012 | Futty et al. ............ 705/26.1 |
| 2012/0143677 A1 | 6/2012 | Bruno et al. |
| 2012/0221404 A1 | 8/2012 | Ahmed et al. |
| 2012/0239786 A1 | 9/2012 | Repasi |
| 2012/0284593 A1 | 11/2012 | Rodriguez |
| 2012/0311139 A1 | 12/2012 | Brave et al. |
| 2012/0311462 A1 | 12/2012 | Devecka |
| 2012/0323888 A1* | 12/2012 | Osann, Jr. ......... G06F 17/30991 707/722 |
| 2013/0024464 A1 | 1/2013 | Berner |
| 2013/0109357 A1 | 5/2013 | Ganatra et al. |
| 2013/0132854 A1 | 5/2013 | Raleigh et al. |
| 2013/0185292 A1 | 7/2013 | Li |
| 2013/0238592 A1 | 9/2013 | Futty et al. |
| 2013/0268396 A1 | 10/2013 | Agevik et al. |
| 2014/0181192 A1 | 6/2014 | Sankar |

FOREIGN PATENT DOCUMENTS

| | | |
|---|---|---|
| JP | 2012-099084 | 5/2012 |
| JP | 2013045279 A | 3/2013 |
| JP | 2013-131009 A | 7/2013 |
| JP | 2013-178691 A | 9/2013 |

OTHER PUBLICATIONS

Costa-Montenegro et al., "Which App? A recommender system of applications in markets: Implementation of the service for monitoring users' interaction", Expert Systems with Applications, vol. 39, Issue 10, Aug. 2012, pp. 9367-9375, 2012, Elseveir Ltd.*

Karatzoglou et al., "Climbing the App Wall: Enabling Mobile App Discovery through Context-Aware Recommendations", CIKM'12, p. 2527-2530, 2012, ACM.*

* cited by examiner

| Application Library | | | | |
|---|---|---|---|---|
| Search Term(s) 502 | Category(s) 504 | Application(s) 506 | Order of Application(s) 508 | Alternative Recommendation(s) 510 |
| Book Search Terms 502-1 | Book Category 504-1 | Book 1, Book 2, Book 3 506-1 | Book 1, Book 2 508-1 | Book 3 510-1 |
| Finance Search Terms 502-2 | Financial Category 504-2 | Finance 1, Finance 2 506-2 | Finance 2, Finance 3 508-2 | Finance 1 510-2 |
| Entertainment Search Terms 502-3 | Entertainment Category 504-3 | Entertainment 1, Entertainment 2, Entertainment 3 506-3 | Entertainment 3, Entertainment 1 508-3 | Entertainment 2 510-3 |

UTILIZING SOCIAL INFORMATION FOR RECOMMENDING AN APPLICATION

BACKGROUND

The present invention relates to utilizing social information for recommending applications, and more specifically, to recommending applications ordered by a social proximity factor.

An application store is used to distribute applications to a number of user devices. An application store is often in the form of an online store, where a user can browse through different types of applications by category or search for specific applications. If a user finds an appropriate application, the user can purchase the application. In response to purchasing the application, the application may be downloaded to the user's user device.

BRIEF SUMMARY

A method for utilizing social information for recommending an application includes providing an application recommendation system based on social characterizations, and responsive to a user searching for an application meeting a criteria, utilizing the application recommendation system by searching for applications meeting the criteria, characterizing the applications according to a social proximity factor to the user, and presenting the applications ordered by the social proximity factor.

A method for utilizing social information for recommending an application includes providing an application recommendation system based on social characterization, and responsive to a user searching for an application meeting a criteria, utilizing the application recommendation system by searching for applications meeting the criteria, characterizing the applications according to a social proximity factor to the user wherein the proximity factor includes the user's proximity to other users on a social media website, the user's relationship strength with the other users on the social media website, or combinations thereof, presenting the applications ordered by the social proximity factor wherein presenting the application comprises presenting the applications with a higher social proximity factor before the applications with a lower social proximity factor, annotating the applications by the social proximity factor wherein annotating the applications comprises annotating the application with an icon of a group making a recommendation regarding the applications, and providing additional information about the applications from the group wherein the additional information comprises a profile picture of the group that uses the applications, a name of a the group, or combinations thereof.

A method for utilizing social information for recommending an application includes providing an application recommendation system based on social characterizations and responsive to a user searching for an application meeting a criteria, utilizing the application recommendation system by characterizing the applications according to a social proximity factor to the user to analyze the criteria against the social proximity factor wherein the proximity factor includes the user's proximity to other users on a social media website, the user's relationship strength with the other users on the social media website, or combinations thereof, and presenting the applications ordered by the social proximity factor wherein presenting the application comprises, based on the criteria and the social proximity factor, populating an application store with the applications from an application library.

A computer program product includes a computer readable storage medium, the computer readable storage medium having computer readable program code embodied therewith. The computer readable program code having computer readable program code to provide an application recommendation system based on social characterizations and responsive to a user searching for an application meeting a criteria, utilizing the application recommendation system to search for applications meeting the criteria, characterize the applications according to a social proximity factor to the user, and present the applications ordered by the social proximity factor.

A system for utilizing social information for recommending an application includes with an application recommendation system based on social characterizations and responsive to a user searching for an application meeting a criteria, utilizing the application recommendation system by using a search engine to search for applications meeting the criteria, an application characterization engine to characterize the applications according to a social proximity factor to the user wherein the proximity factor includes the user's proximity to other users on a social media website, the user's relationship strength with the other users on the social media website, or combinations thereof, an application presentation engine to present the applications ordered by the social proximity factor wherein the application presentation engine presents the applications with a higher social proximity factor before the applications with a lower social proximity factor, an annotation engine to annotate the applications by the social proximity factor wherein the annotation engine to annotates the application with an icon of a group making a recommendation regarding the applications, and an additional information engine to provide additional information about the applications from the group wherein the additional information comprises a profile picture of the group that uses the applications, a name of the group, or combinations thereof.

A system for utilizing social information for recommending an application includes an application recommendation system based on social characterizations and responsive to a user searching for an application meeting a criteria, utilizing the application recommendation system by using an application characterization engine to characterize the applications according to a social proximity factor to the user to analyze the criteria against the social proximity factor wherein the proximity factor includes the user's proximity to other users on a social media website, the user's relationship strength with the other users on the social media website, or combinations thereof, and an application presentation engine to present the applications ordered by the social proximity factor and based on the criteria and the social proximity factor, populate an application store with the applications from an application library.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

The present specification describes a method and system for recommending applications utilizing social information such that applications are presented to a user ordered by a social proximity factor.

As will be appreciated by one skilled in the art, aspects of the present specification may be embodied as a system, method, or computer program product. Accordingly, aspects of the present specification may take the form of hardware or a combination of hardware and software. Furthermore, aspects of the present specification my take the form of a computer program product embodied in a number of computer readable mediums having computer readable program code embodied thereon.

Any combination of computer readable medium(s) may be utilized. A computer readable storage medium may be, for example, but not limited to, an electronic, magnetic, optical electromagnetic, infrared, or semiconductor system, apparatus, or device or any suitable combination of the foregoing. More specific examples (a non-exhaustive list) of the computer readable mediums would include the following: an electrical connection having a number of wires, a portable computer diskette, a hard disk, a random access memory (RAM), a read-only memory (ROM), an erasable programmable read-only memory (EPROP or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain, or store a program for use by or in connection with any instruction execution system, apparatus, or device such as, for example, a processor.

Program code embodied on a computer readable medium may be transmitted using any appropriate medium, including but not limited to wireless, wire line, optical fiber cable, RF, etc., or any suitable combination of the foregoing.

Computer program code for carrying out operations of the present specification may be written in an object oriented programming language such as Java, Smalltalk, or C++, among others. However, the computer program code for carrying out operations of the present systems and methods may also be written in procedural programming languages, such as, for example, the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, thought the internet using an internet service provider).

Flowchart illustrations and/or block diagrams of methods, apparatus, and computer program products are disclosed. Each block of the flowchart illustrations and/or block diagrams, and combinations of blocks in the flowchart illustrations and/or block diagrams, can be implemented by computer program instructions. These computer program instructions may be provided to a processor or other programmable data processing apparatus to produce a machine, such that the instructions, which execute via a processor of the computer or other programmable data processing apparatus, implement the functions/acts specified in the flowchart and/or block diagram block or blocks.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

In one example, these computer program instructions may be stored in a computer-readable memory that can direct a computer or other programmable data processing apparatus to function in a particular manner, such that the instructions stored in the computer-readable memory produce an article of manufacture including instructions which implement the functions/act specified in the flowchart and/or block diagram blocks or blocks.

The computer program instructions may also be loaded onto a computer or other programmable data processing apparatus to cause a series of operations to be performed on the computer or other programmable apparatus to produce a computer implement process such that the instructions which execute on the computer or other programmable apparatus implement the functions/acts specified in the flowchart and/or block diagram blocks or blocks.

As noted above, an application store is often in the form of an online store, where a user can browse through different types of applications by category or search for particular applications. Once a user has selected a category or searched for an application, the application store displays applications related to the selected category or the selected search for the application. An application store can display the applications in order of the most popular applications, the highest rated applications, and new arrivals. Often, an application will be reviewed by other users who have downloaded the application.

Although the application store can display application in a number of ways, a user may read through several reviews of each of the applications to understand if each of the applications is what the user is looking for. With hundreds of applications being uploaded to the application store daily, different applications are displayed to a user each day. Further, an application may be reviewed by other users who the user does not know personally. Reading through each review of the application can be a burdensome task for the user. Further, not knowing the other users who reviewed the applications can be a frustration for the user.

The principles described herein include a system and a method for utilizing social information for recommending an application. Such a method includes providing an application recommendation system based on social characterizations, and responsive to a user searching for an application meeting a criteria, utilizing the application recommendation system by searching for applications meeting the criteria, characterizing the applications according to a social proximity factor to the user, and presenting the applications ordered by the social proximity factor. Such a method allows applications to be presented to a user ordered by a social proximity factor. As a result, the user is presented with applications in a more meaningful way. For example, the applications may be presented to a user according to aggregated group information. In this example, the aggregated group information may include information stating that a specific application is highly rated by four of five book club members.

Further, the method can include providing additional information about the application from a group. Providing additional information about the application will be described in more detail later on in this specification.

A social proximity factor may be a characterization of a user's proximity to other users on a social media website. For example, the social proximity factor may be how one user is related to another user. In one example, one user may be a sibling to another user. In this example, the social proximity factor, according to the user's proximity, may be close. Further, the social proximity factor may be a characterization of a user's relationship strength with other users on the social media website. For example, best friends may be in constant contact with each other. In this example, social proximity factor, according to the user's relationship strength, may be strong. As a result, a social proximity factor may include a user's proximity to other users on a social media website, the user's relationship strength with other users on the social media website, or combinations thereof.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
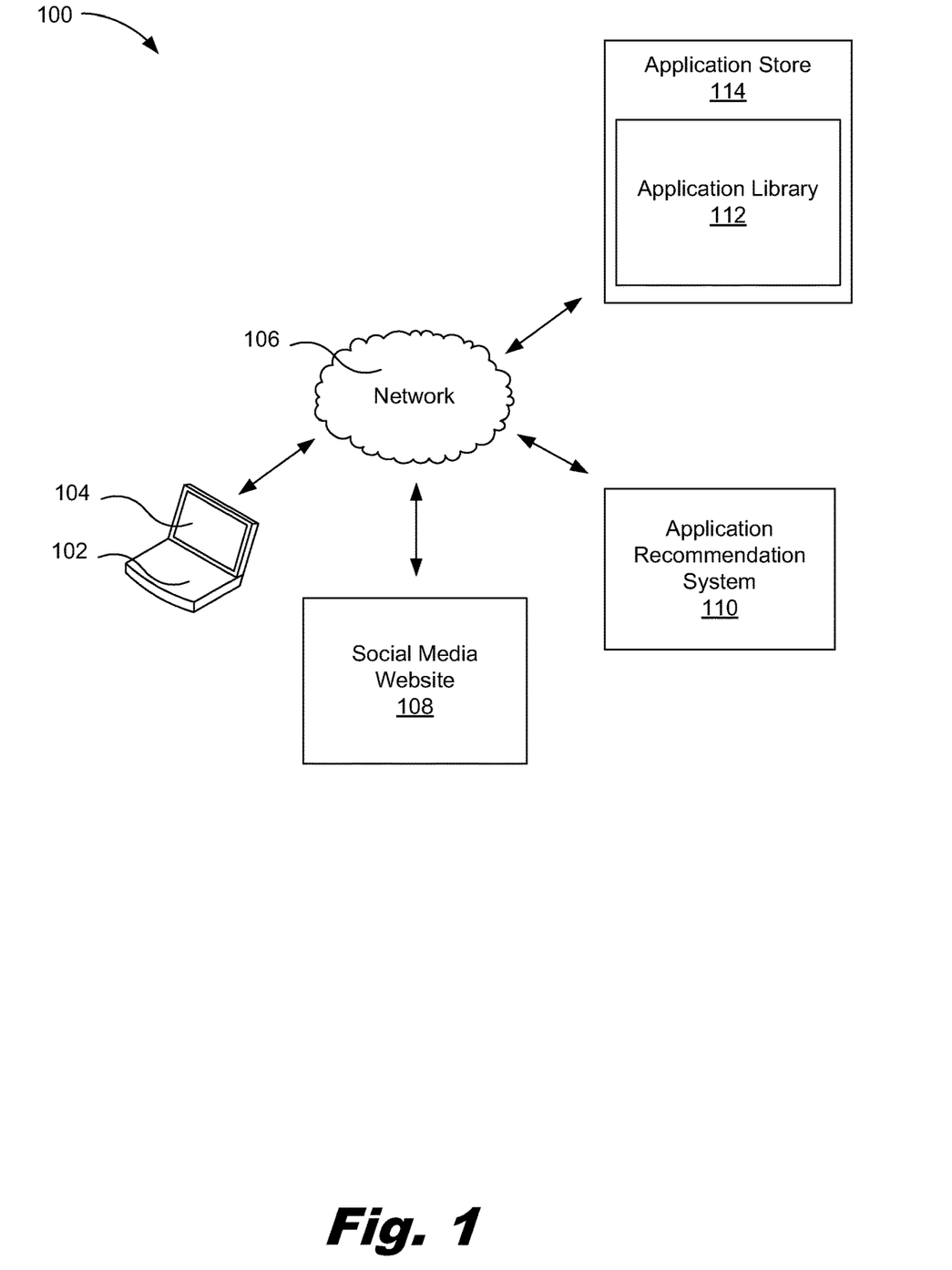
FIG. 1 is a diagram of an example of a system for utilizing social information for recommending an application, according to one example of principles described herein.

Referring now to the figures, FIG. 1 is a diagram of an example of a system for utilizing social information for recommending an application, according to one example of principles described herein. As will be described below, an application recommendation system is in communication with a network to search for applications meeting criteria in response to a user searching for an application meeting the criteria. Further, the application recommendation system characterizes the applications according to a social proximity factor to the user. Additionally, the application recommendation system presents the applications ordered by the social proximity factor.

As mentioned above, the system (100) includes a user device (102) with a display (104). In one example, a user accesses a network (106) with the user device (102). In one example, the network (106) may allow a user to access an application store (114). In this example, the application store (114) stores, in memory, an application library (112). In keeping with the example, the application library (112) includes a number of applications that a user may download to the user device (102). As a result, the display (104) displays the applications from the application store (114).

The system (100) further includes an application recommendation system (110). In keeping with the given example, the application recommendation system (110) is in communication with a network (106) to search for applications meeting criteria in response to a user search for an application meeting the criteria. For example, if the criteria indicate that the user is searching for a financial application, the application recommendation system (110) searches for financial applications. As will be described below, the application recommendation system (110) analyzes what the user is searching for in the application store (114) based on the criteria the user selects. In one example, the application recommendation system (110) analyzes the criteria based on search terms, enumerated categories, other criteria, or combinations thereof that the user selects.

Further, the application recommendation system (110) characterizes the applications according to a social proximity factor to the user. In this example, the application recommendation system (110) performs an analysis of the criteria against the user's various circles of friends within the social media website (108). As will be described below, the application recommendation system (110) may use a social proximity factor such as a user's proximity to other users on the social media website (108), the user's relationship strength with other users on the social media website (108), or combinations thereof to analyze the criteria against the social proximity factor.

Also, the application recommendation system (110) presents the applications ordered by the social proximity factor. As will be described below, based on the search criteria and the social proximity factor, the application store (114) is populated with application from the application library (112) in a more meaningful way. In one example, the applications may be presented to a user according to aggregated group information. In this example, the aggregated group information may include information stating that a specific application is highly rated by four of five book club members. As a result, the application recommendation system (110) allows an application to be recommended to a user based on what type of application the user is looking for and based on applications that the user's friends use. The application recommendation system (110) will be described in more detail below.

While this example has been described with reference to the application recommendation system being located over the network, the application recommendation system may be located in any appropriate location according to the principles described herein. For example, the recommending system may be located in a user device, a server, a social media website, an application library, an application store, or combinations thereof. Further, the application store may be located in the application recommendation system, a server, a user device, a social media website, or combinations thereof. In some examples, the application recommendation system presents one application to a user ordered by the social proximity factor. In other examples, the application recommendation system presents multiple applications to a user ordered by the social proximity factor.

Further, the application recommendation system may present an alternative recommendation responsive to identifying problems with the applications. For example, if an application presented to a user fails to meets the criteria set by the user, such as having a low rating, missing a feature, an alternative recommendation is presented to the user. In one example, the application recommendation system may present at least one alternative recommendation. In another example, the application recommendation system may not present an alternative recommendation.

Figure 2:
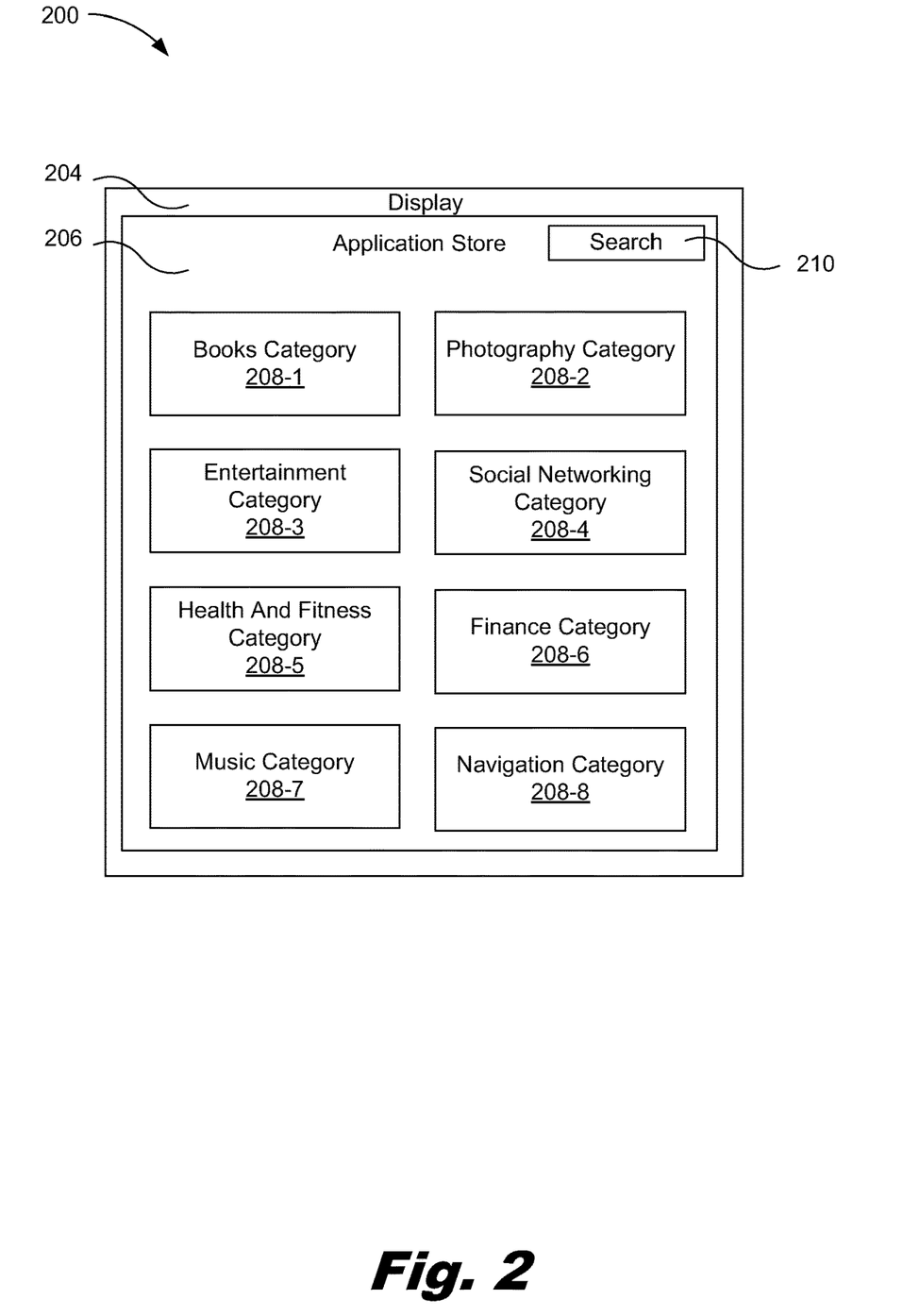
FIG. 2 is a diagram of an example of an application store, according to one example of principles described herein.

FIG. 2 is a diagram of an example of an application store, according to one example of principles described herein. As mentioned above, a user can access a network (FIG. 1, 106) with a user device (FIG. 1, 102). Further, a display (FIG. 1, 104) on the user device (FIG. 1, 102) is used to display applications from an application store (FIG. 1, 114). Further, the application recommendation system (FIG. 1, 110) searches for application meeting criteria in response to a user searching for an application meeting the criteria. As will be described below, the application recommendation system (FIG. 1, 110) presents the applications ordered by a social proximity factor.

Turning specifically to FIG. 2, a display (204) on a user device (FIG. 1, 102) is used to display application categories (208) from the application store (206). In one example, the application store (206) may have eight application categories (208). In this example, the application categories may include a books category (208-1), a photography category (208-2), an entertainment category (208-3), a social network category (208-4), a health and fitness category (208-5), a finance category (208-6), music category (208-7), and a navigation category (208-8). In this example, the books category (208-1) may contain applications related to books. The photography category (208-2) may contain applications related to photography. The entertainment category (208-3) may contain applications related to photography. The social network category (208-4) may contain applications related to social networks. The health and fitness category (208-5) may contain applications related to health and fitness. The finance category (208-6) may contain applications related to finance. The music category (208-7) may contain applications related to music. The navigation category (208-8) may contain applications related to navigation. In one example, criteria may be received by the application recommendation system (FIG. 1, 110) when the user selects a category (208).

As mentioned above, the application recommendation system (FIG. 1, 110) analyzes what the user is searching for based on what criteria the user selects. Further, the application recommendation system (FIG. 1, 110) searches for applications meeting the criteria in response to a user searching for an application meeting the criteria. In one example, if a user selects the books category (208-1), the application recommendation system (FIG. 1, 110) searches for application meeting criteria for books. In this example, an application related to books. In another example, if a user selects the finance category (208-6), the application recommendation system (FIG. 1, 110) searches for application meeting a criteria. In this example, an application related to finance.

In another example, the criteria based on the user input may be received when the user enters a search term into a search box (210). For example, the user enters the search term, sports. In this example, the application recommendation system (FIG. 1, 110) analyzes what the user is searching for based on what criteria the user selects and searches for applications meeting the criteria. In this example, an application related to sports. In yet another example, the user may enter a friend's name into the search box (210) to search for applications that the friend uses. For example, the user enters a friend's name such as Jane Doe into the search box (210). In this example, the application recommendation system (FIG. 1, 110) analyzes what the user is searching for based on what criteria the user selects and searches for applications meeting the criteria. In this example, applications that Jane Doe uses. In another example, the user may enter a company's name into the search box (210) to search for applications that the company uses. For example, the user enters a company name such as Company X into the search box (210). In this example, the application recommendation system (FIG. 1, 110) analyzes what the user is searching for based on what criteria the user selects and searches for applications meeting the criteria. In this example, applications that Company X uses.

While this example has been described with reference to the application store having eight application categories, an application store may have less or more than eight application categories. For example, the application store may have two application categories. In another example, the application store may have one-hundred application categories.

While this example has been described with reference to the criteria being received by the application recommendation system when the user selects a category or enters search terms into a search box, the criteria may be received by any other appropriate mechanism according to the principles described herein. For example, the criteria may be received when a use interacts with a graphical user interface (GUI). In this example, the GUI allows the user enter in information such as a minimum rating for an application, specific features for that the application should include, a maximum purchase price for an application, other information, or combinations thereof. In one example, checkboxes may be used to receive criteria. In another example, icons may be used to receive criteria. In yet another example, text boxes may be used to allow the application recommendation system to receive criteria. Further, criteria may be selected from a group consisting of a search string, a category, a social network, an individual, an organization, and combinations thereof.

Figure 3:
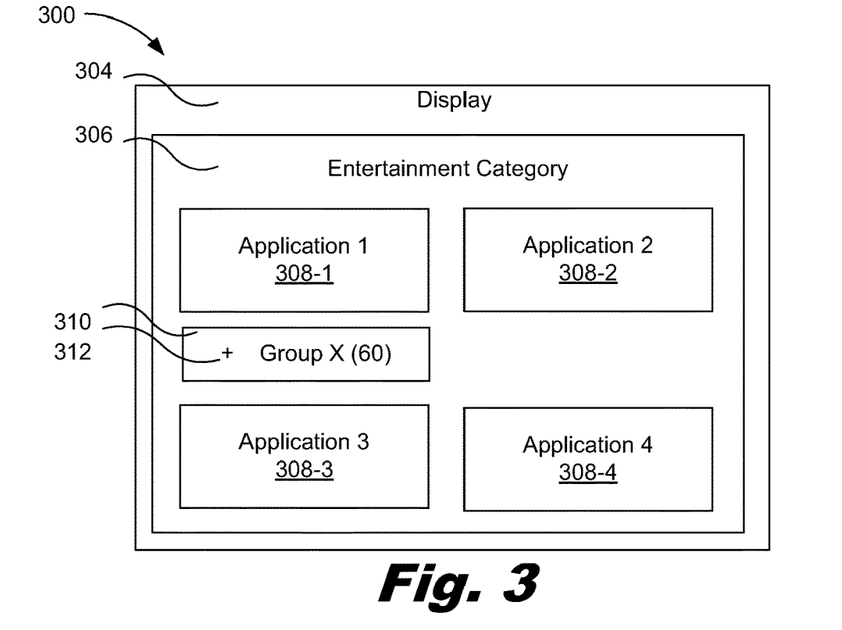
FIG. 3 is a diagram of an example of a category for an application store, according to one example of principles described herein.

FIG. 3 is a diagram of an example of a category for an application store, according to one example of principles described herein. As mentioned above, a user uses a user device (FIG. 1, 102) to access a network (FIG. 1, 106). Further, a display (304) on the user device (FIG. 1, 102) is used to display applications from an application store (FIG. 1, 114). Further, an application recommendation system (FIG. 1, 110) searches for applications meeting a criteria in response to a user searching for an application meeting the criteria. As will be described below, the application recommendation system (FIG. 1, 110) presents the applications ordered by a social proximity factor.

Turning specifically to FIG. 3, a display (304) on a user device (FIG. 1, 102) is used to present the applications ordered by a social proximity factor. In one example, the application recommendation system (FIG. 1, 110) receives criteria indicating a user is looking for an entertainment application. As mentioned above, the application recommendation system (FIG. 1, 110) analyzes what the user is searching for based on what criteria the user selects and searches for applications meeting the criteria In this example, the criteria indicate the user is looking for an entertainment application that is used by many of the user's friends from group X. Further, the application recommendation system (FIG. 1, 110) presents the applications ordered by a social proximity factor. As mentioned above, the application recommendation system (FIG. 1, 110) may use a social proximity factor such as a user's proximity to other users on the social media website (FIG. 1, 108), the user's relationship strength with other users on the social media website (FIG. 1, 108), or combinations thereof to analyze the criteria against the social proximity factor. In this example, application 1 (308-1) has the highest rated social proximity factor that meets the criteria. As a result, application 1 (308-1) is presented first to the user. Further, in this example, the application recommendation system (FIG. 1, 110) presents three alternative recommendations (308-2, 308-3, 308-3) to the user if application 1 (308-1) fails to meet the criteria or if application 1 (308-1) is identified to have problems. For example, if application 1 (308-1) has bad review by the user's group of friends, application 1 (308-1) has missing features, the alternative recommendations (308-2, 308-3, 308-3) may be presented to the user. In one example, the application recommendation system (FIG. 1, 110) may present at least one alternative recommendation. In another example, the application recommendation system (FIG. 1, 110) may not present an alternative recommendation.

Further, additional information (310) for application 1 (308-1) is displayed to the user. In one example, the additional information (310) may be expanded to display the additional information by selecting an expanding button (312). More information about the additional information (310) will be described in FIG. 4.

Figure 4:
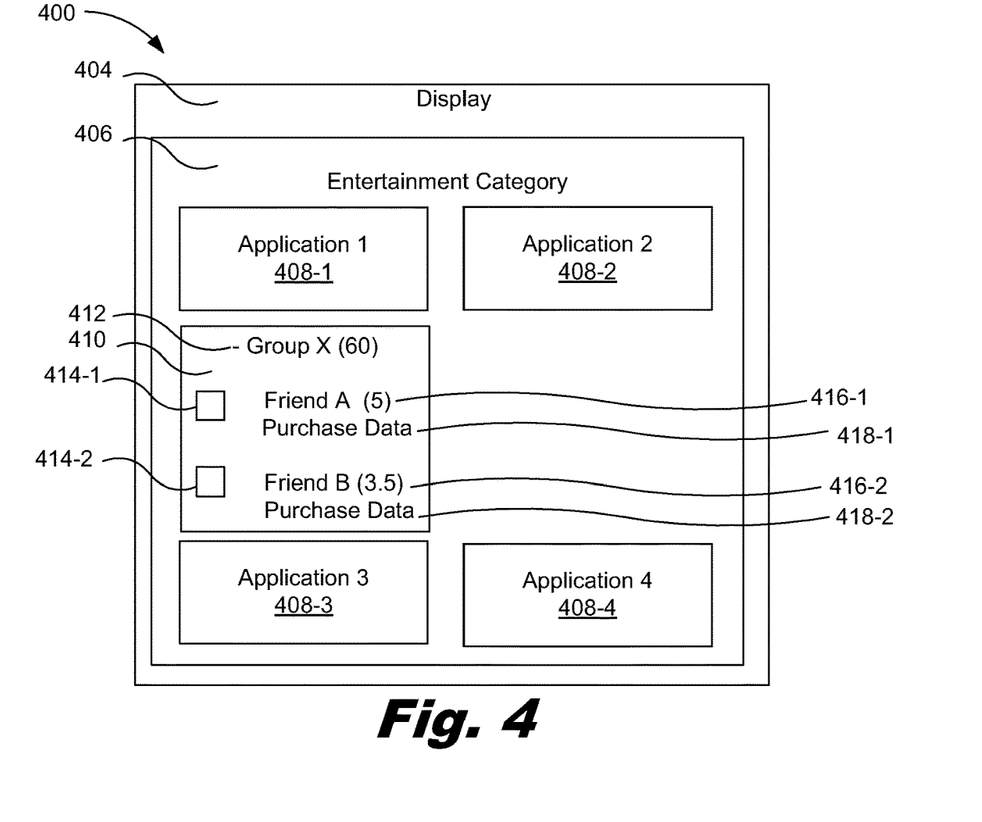
FIG. 4 is a diagram of an example of a category for an application store, according to one example of principles described herein.

FIG. 4 is a diagram of an example of a category for an application store, according to one example of principles described herein. As mentioned above, a user uses a user device (FIG. 1, 102) to access a network (FIG. 1, 106). Further, a display (404) on the user device (FIG. 1, 102) is used to display applications from an application store (FIG. 1, 114). Further, an application recommendation system (FIG. 1, 110) searches for application meeting a criteria in response to a user searching for an application meeting the criteria. As will be described below, the application recommendation system (FIG. 1, 110) presents the applications ordered by a social proximity factor.

In the example of FIG. 4, a display (404) on a user device (FIG. 1, 102) is used to present the applications ordered by a social proximity factor. In one example, the application recommendation system (FIG. 1, 110) receives criteria indicating a user is looking for an entertainment application. As mentioned above, the application recommendation system (FIG. 1, 110) analyzes what the user is searching for based on what criteria the user selects and searches for applications meeting the criteria. In this example, four applications (408) are presented in the entertainment category (406). Further, the applications (408) may be presented to a user according to aggregated group information. As mentioned above, additional information (410) for application 1 (408-1) is displayed to the user. In one example, the additional information (410) may be expanded to display the additional information by selecting an expanding button (412). In this example, the additional information (410) may include a picture (414-1, 414-2 respectively) for Friend A and Friend B that use application 1 (408-1). The additional information (410) may include a rating (416) of application 1 (408-1) given by Friend A (416-1) and Friend B (416-2). In this example, Friend A gave application 1 (408-1) a rating (416-1) of 5 and Friend B gave application 1 (408-1) a rating (416-2) of 3.5. In another example, the additional information (410) may include aggregated group information. In this example, the aggregated group information may include information stating application 1 (408-1) is highly rated by 20 of 23 members of Entertainment Club X. In another example, the additional information (410) may include a purchase data (418) of application 1 (408-1). In this example, the purchase date may include the price of application 1 (408-1), the length of ownership for application 1 (408-1), other purchase data, or combinations thereof.

While this example has been described with reference to additional information displaying information such as a picture, a name, a rating, purchase data, any other appropriate information may be displayed as additional information. For example, the additional information may display if the application is currently installed on a friend's user device, how often a friend uses the application, other information, or combinations thereof.

Figure 5:
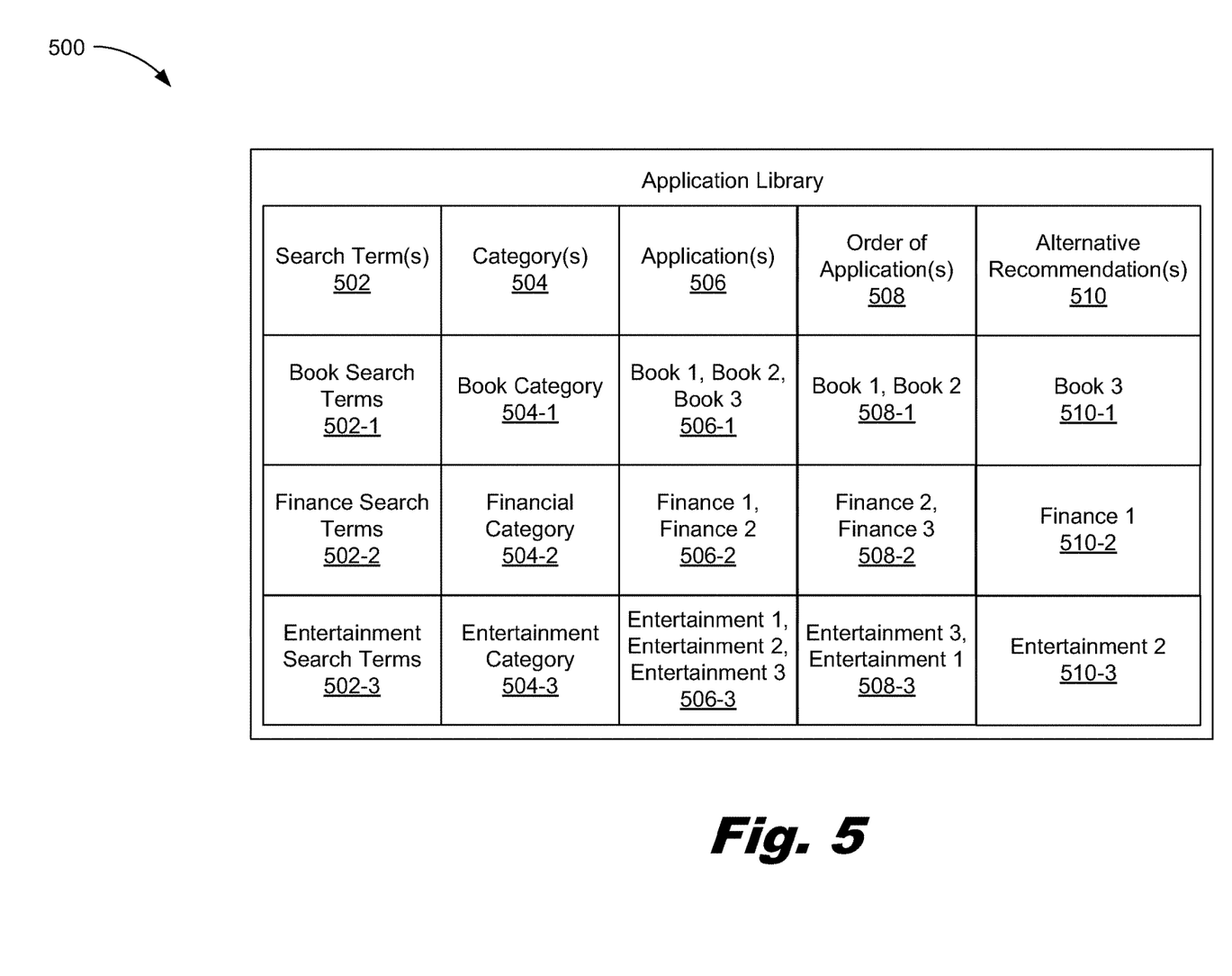
FIG. 5 is a diagram of an example of an application library, according to principles described herein.

FIG. 5 is a diagram of an example of an application library, according to principles described herein. As mentioned above, the application recommendation system (FIG. 1, 110) references an application library (500) of application (506) from an application store. The application library (500) includes application entries for applications (506) that are associated with search terms (502), categories (504). The application library (500) further includes ordered applications (508) ordered by a social proximity factor and alternative recommendations (510) for the identified problems with the applications.

In the example of FIG. 5, the application library (500) includes applications (506) such as book applications (506-1), finance applications (506-2), and entertainment applications (506-3). Although this application library (500) includes three types of applications (506), in practice an application library may contain more than three types of applications. Further, the applications (506) in the application library (500) have a category (504) associated with each application (506). For example, the book applications (506-1) such as book 1, book 2, and book 3 are associated with a book category (504-1). Further, the book applications (506-1) are associated with book search terms (502-1) such as author, genera, publish date, other search terms related to books, or combinations thereof. In one example, if a user enters in a search term specifying author X, the application recommendation system (FIG. 1, 110) analyzes what the user is searching for based on what criteria the user selects and searches for applications meeting the criteria. In this example, author X. In one example, the application recommendation system may identify book applications (506-1) such as book 1, book 2, and book 3. As mentioned above, the application recommendation system (FIG. 1, 110) characterizes the application according to a social proximity factor to the user. In this example, the application recommendation system (FIG. 1, 110) characterizes book 1 and book 2 and orders the applications (508-1) according to a social proximity factor to the user and book 3 (510-1) as an alternative recommendation (510).

In another example, the finance applications (506-2) such as finance 1, finance 2, and finance 3 are associated with a finance category (504-2). Further, the finance applications (506-2) are associated with finance search terms (502-2) such as money, accounting, finance, other search terms related to finance, or combinations thereof. In one example, if a user enters in a search term specifying money, the application recommendation system (FIG. 1, 110) analyzes what the user is searching for based on what criteria the user selects and searches for applications meeting the criteria. For example, the application recommendation system (FIG. 1, 110) may identify finance applications (506-2) such as finance 1, finance 2, and finance 3. As mentioned above, the application recommendation system (FIG. 1, 110) characterizes the applications from the application library according to a social proximity factor to the user. In this example, the application recommendation system (FIG. 1, 110) characterizes finance 2 and finance 3 and orders the applications (508-2) according to a social proximity factor to the user and book 3 (510-1) as an alternative recommendation (510).

In another example, the entertainment applications (506-3) such as entertainment 1, entertainment 2, and entertainment 3 are associated with an entertainment category (504-3). Further, the entertainment applications (506-3) are associated with entertainment search terms (502-3) such movies, concert, actors, other search terms related to entertainment, or combinations thereof. In one example, if a user enters in a search term specifying a movie, the application recommendation system (FIG. 1, 110) analyzes what the user is searching for based on what criteria the user selects and searches for applications meeting the criteria. For example, the application recommendation system (FIG. 1, 110) may identify entertainment applications (506-3) such as entertainment 1, entertainment 2, and entertainment 3. As mentioned above, the application recommendation system (FIG. 1, 110) characterizes the applications from the application library according to a social proximity factor to the user. In this example, the application recommendation system (FIG. 1, 110) characterizes entertainment 3 and entertainment 1 and orders the applications (508-3) according to a social proximity factor to the user and entertainment 2 (510-3) as an alternative recommendation (510).

Figure 6:
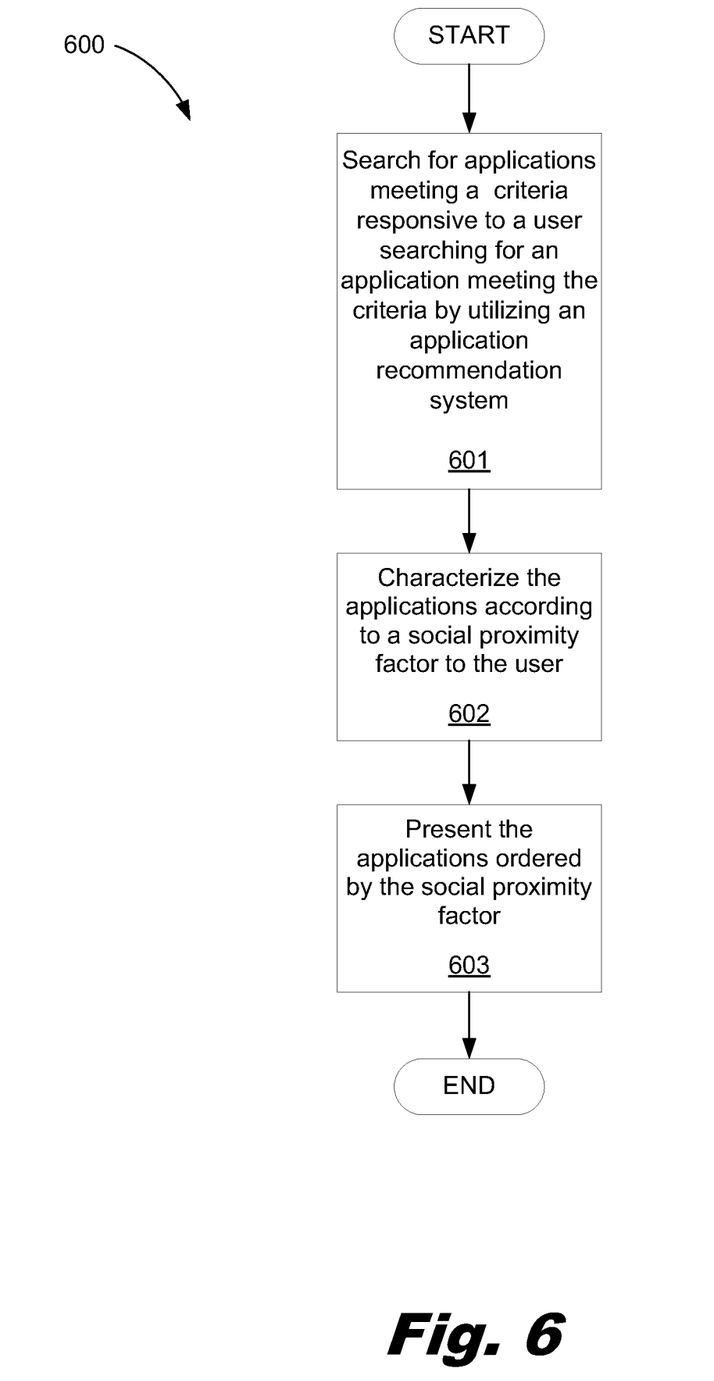
FIG. 6 is a flowchart of an example of a method for utilizing social information for recommending an application, according to principles described herein.

FIG. 6 is a flowchart of an example of a method for recommending an application, according to principles described herein. In one example, the method (600) includes searching (601) for applications meeting a criteria responsive to a user searching for an application meeting the criteria by utilizing an application recommendation system, characterizing (602) the applications according to a social proximity factor to the user, and presenting (603) the applications ordered by the social proximity factor.

As mentioned above, the method (600) includes searching (601) for applications meeting a criteria responsive to a user searching for an application meeting the criteria by utilizing an application recommendation system. As mentioned above, the application recommendation system (FIG. 1, 110) may receive and analyze what the user is searching for in the application store (FIG. 1, 114) based on the criteria the user selects. In one example, the application recommendation system (FIG. 1, 110) analyzes the criteria based on search terms, enumerated categories, other criteria, or combinations thereof that the user selects.

In one example, the method (600) searches for applications from an application library based on search terms a user enters into a search box. For example, if a user enters search terms such as finance into a search box, applications that are related to finance are identified in the application library. In another example, the method (600) searches applications from an application library category that a user selects. For example, if a user selects a music category, applications that are related to music are identified in the application library. In another example, if a user selects a top application category, applications that are related to top applications are identified in the application library.

While this example has been described with reference to the criteria being received by the application recommendation system when the user selects a category or enters search terms into a search box, the criteria may be received by any other appropriate mechanism according to the principles described herein. For example, the criteria may be received when a use interacts with a GUI. In this example, the GUI allows the user enter in information such as a minimum rating for an application, specific features for that the application should include, a maximum purchase price for an application, other information, or combinations thereof. In one example, checkboxes may be used to receive criteria. In another example, icons may be used to receive criteria. In yet another example, text boxes may be used to allow the application recommendation system to receive criteria. Further, criteria may be selected from a group consisting of a search string, a category, a social network, an individual, an organization, and combinations thereof.

The method (600) further includes characterizing (602) the applications according to a social proximity factor to the user. As mentioned above, the application recommendation system (FIG. 1, 110) may use a social proximity factor such as a user's proximity to other users on the social media website (FIG. 1, 108), the user's relationship strength with other users on the social media website (FIG. 1, 108), or combinations thereof to analyze the criteria against the social proximity factor. As a result, applications may be characterized according to the social proximity factor to the user. In one example, the criteria, such as the search terms or the categories, are received by an application recommendation system (FIG. 1, 110). In this example, the application recommendation system (FIG. 1, 110) references a social media website (FIG. 1, 108). The application recommendation system (FIG. 1, 110) performs an analysis of the criteria against the user's various circles of friends within the social media website to determine a social proximity factor to the user.

As mentioned above, a social proximity factor to the user may be a characterization of a user's proximity to other users on the social media website. In this example, the social proximity factor may be how one user is related to another user. For example, one user may be a sibling to another user. As a result, the social proximity factor may be close. In another example, if one user is not related at all to another user, the social proximity factor may be very far.

Further a social proximity factor according to a user's proximity to other users on the social media website may be symbolic such as very close, close, far, very far. In another example, a social proximity factor may be a range. For example, 0 indicating a social proximity factor, according to a user's proximity to other users on the social media website, is very far and 10 indicating the social proximity factor, according to a user's proximity to other users on the social media website are very close. As a result, if the application recommendation system is characterizing applications from the application library, an application that has a very close social proximity factor for a user may be more relevant than another application that has a very far social proximity factor for the user. As will be described below, the application that has a very close social proximity factor for a user may be presented as a recommended application and the other application may or may not be presented to the user.

Further, the social proximity factor may include the user's relationship strength with other users on the social media website. For example, how close one user is to another user. In one example, best friends may be in constant contact with each other. In this example, social proximity factor may be strong according to the user's relationship strength with other user on the social media website.

Further a social proximity factor, according to the user's relationship strength with other users on the social media website, may also be symbolic such as very strong, strong, weak, very weak. In another example, a social proximity factor may be a range. As a result, if the application recommendation system is characterizing applications from the application library, an application that has a very strong social proximity factor for a user may be more relevant than another application that has a very weak social proximity factor for the user. Thus, a social proximity factor may include a how one user is related to another user, how close one user is to another user, or combinations thereof.

Further, characterizing the applications according to a social proximity factor to the user may include characterizing the applications according to a work group. In another example, characterizing the applications according to a social proximity factor to the user may include characterizing the applications according to an expertise group.

The method (600) further includes presenting (603) the applications ordered by the social proximity factor. As mentioned above, based on the search criteria and the social proximity factor, the application store (114) is populated with application from the application library (112) in a more meaningful way. In one example, the applications may be presented to a user according to aggregated group information. In this example, the aggregated group information may include information stating application A is highly rated by 4 of 5 book club members.

Further, presenting the application from the applications ordered by the social proximity factor includes presenting an application that has a higher social proximity factor before an application having a lower social proximity factor. For example, an application characterized with a very close social proximity factor and strong social proximity factor may be presented to a user before an application characterized with a close social proximity factor and weak social proximity factor.

Figure 7:
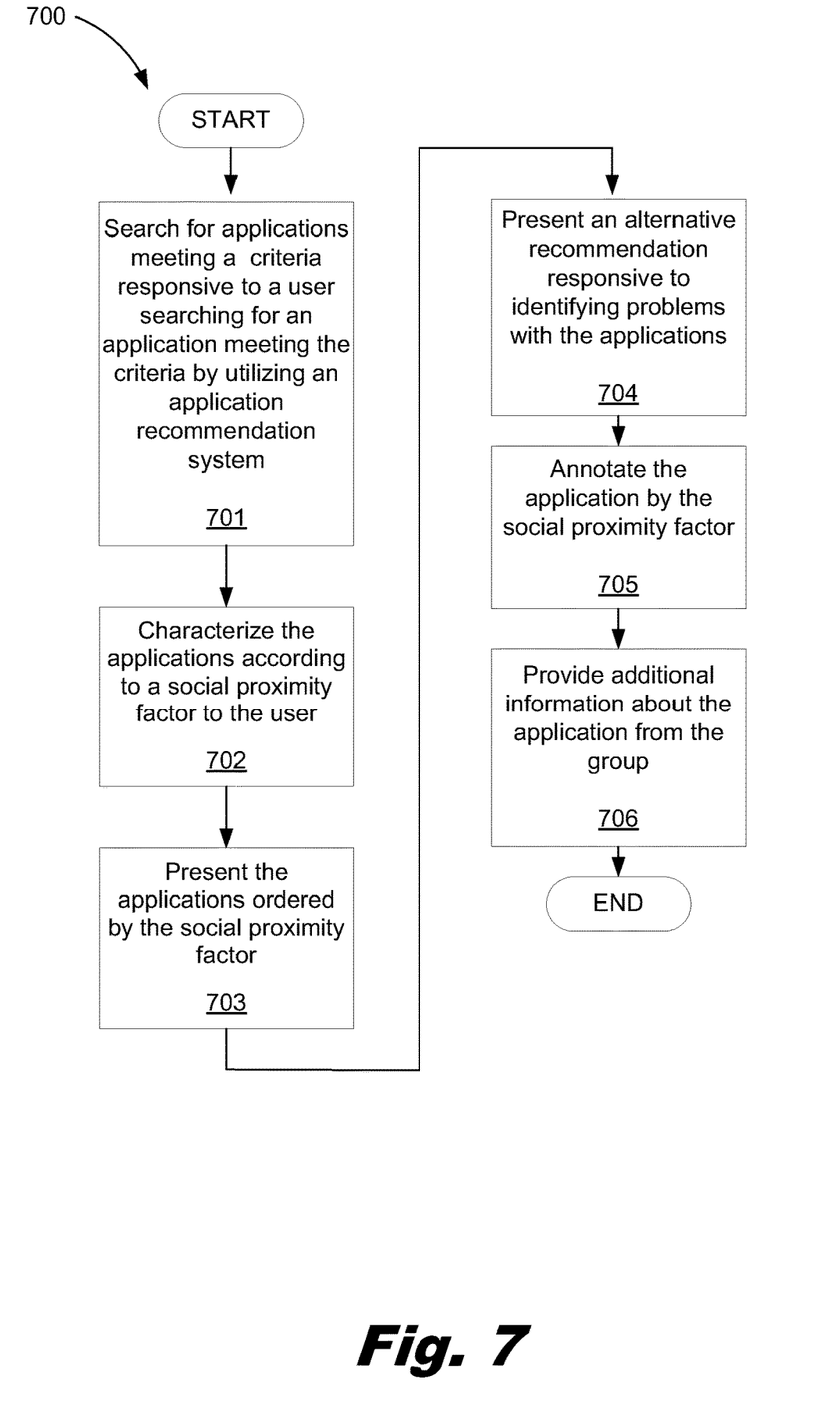
FIG. 7 is a flowchart of an example of a method for utilizing social information for recommending an application, according to principles described herein.

FIG. 7 is a flowchart of an example of a method for recommending an application, according to principles described herein. In this example, the method (700) includes searching (701) for applications meeting a criteria responsive to a user searching for an application meeting the criteria by utilizing an application recommendation system, characterizing (702) the applications according to a social proximity factor to the user, presenting (703) the applications ordered by the social proximity factor, presenting (704) an alternative recommendation responsive to identifying problems with the application, annotating (705) the application by the social proximity factor, and providing (706) additional information about the application from the group.

As mentioned above, the method (700) includes presenting (704) an alternative recommendation responsive to identifying problems with the application. In one example, an alternative application may be presented to a user when a friend's recommended application does not meet the user's needs, expectations, or criteria. For example, if an application has a bad review, a low rating, missing features, or combinations thereof, an alternative recommendation may be presented to a user.

Further, an alternative recommendation is based on similarities to the application requested. For example, if a user request an application about finance, but the applications presented to the user fails to meet the criteria the user specified, and alternative recommendation for an application about finance may be presented to the user. In one example, the alternative recommendation is from an expertise group. In this example, an expertise group may be an organization, an individual, a company, other expertise groups, or combinations thereof.

The method (700) further includes annotating (705) the application by the social proximity factor. In one example, for an application to be recommended to a user, the application is to be above a certain threshold. For example, if an application has a low social proximity factor the application may not be recommended to the user. Further, if an application has a high social proximity factor the application may be recommended to the user.

The method (700) further includes providing (706) additional information about the application from the group. In one example, the additional information may be expanded to display additional information to a user. In one example, the additional information may include annotating a picture or icon of a user that uses the application. For example, a profile picture of the user that uses that application. In another example, the additional information may include annotating a picture or icon of a group making a recommendation regarding the applications.

Further, the additional information may include the name of the group or individual that uses the application. For example, company X, group X, Friend A, other groups, other individuals, or combinations thereof.

The additional information may include a rating of the application. In one example, the rating may be symbolic such as very good, good, bad, very bad. In another example, a rating may be a range. For example, 0 indicating the application is very bad and 10 indicating application is very good.

In another example, the additional information may include a purchase data of the application. In this example, the purchase data may include a purchase date, the length of ownership, the last time the user used the application, other purchase data, or combinations thereof.

Figure 8:
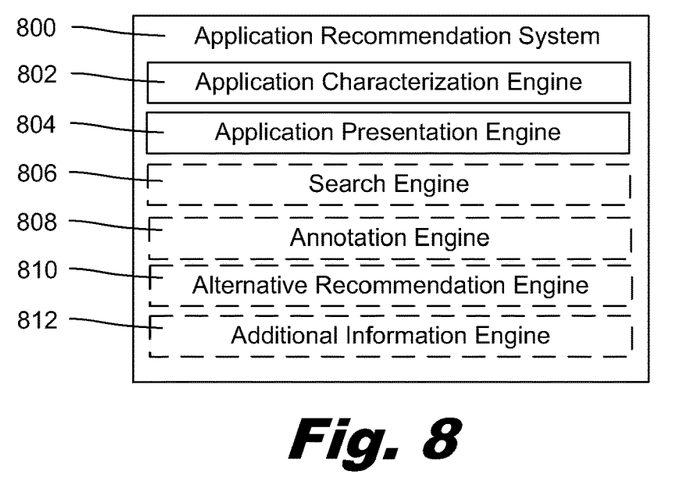
FIG. 8 is a diagram of an example of an application recommendation system, according to one example of principles described herein.

FIG. 8 is a diagram of an example of an application recommendation system (800), according to one example of principles described herein. The application recommendation system (800) includes an application characterization engine (802) and an application presentation engine (804). In this example, the system (800) also includes a search engine (806), an annotation engine (808), an alternative recommendation engine (810), and an additional information engine (812). The engines (802, 804, 806, 808, 810, 812) refer to a combination of hardware and program instructions to perform a designated function. Each of the engines (802, 804, 806, 808, 810, 812) may include a processor and memory. The program instructions are stored in the memory and cause the processor to execute the designated function of the engine.

The application characterization engine (802) characterizes the applications according to a social proximity factor to the user. In one example, a social proximity factor may include a user's proximity to other users on a social media website, the user's relationship strength with other users on the social media website, or combinations thereof. Further, in one example, the application characterization engine (802) characterizes the applications according to a close social proximity factor. In another example, the application characterization engine (802) characterizes the applications according to a close and strong social proximity factor.

The application presentation engine (804) presents applications ordered by the social proximity factor. In one example, applications with a close proximity factor may be ordered before application with a far proximity factor. Further, applications with a strong proximity factor may be ordered before application with a weak proximity factor. As a result, based on the search criteria and the social proximity factor, the application store is populated with application from the application library in a more meaningful way and presented to a user.

The search engine (806) searches for applications meeting criteria responsive to a user searching for an application meeting the criteria by utilizing an application recommendation system. In one example, the criteria are selected from a group consisting of a search string, a category, a social network, an individual, an organization, and combinations thereof. In one example, the search engine (806) analyzes what the user is searching for in an application store based on the criteria the user selects. In one example, the search engine (806) analyzes the criteria based on search terms, enumerated categories, other criteria, or combinations thereof that the user selects.

The annotation engine (808) annotates the application based on the social proximity factor. In one example, if a social proximity factor for an application is below, a social proximity factor threshold, the application may not be annotated.

The alternative recommendation engine (810) presents an alternative recommendation responsive to identifying problems with the applications. In one example, an alternative application may be presented to a user when a friend's recommended application does not meet the user's needs, expectations, or criteria. For example, if an application has a bad review, a low rating, missing features, or combinations thereof, an alternative recommendation may be presented to a user.

The additional information engine (812) provides additional information about the application from the group. In one example, the additional information may include a picture or icon of a user that uses the application. For example, a profile picture of the user that uses that application. Further, the additional information may include the name of the group or individual that uses the application. For example, company X, group X, Friend A or combinations thereof. The additional information may include a rating of the application. In one example, the rating may be symbolic such as very good, good, bad, very bad. In another example, a rating may be a range. For example, 0 indicating the application is very bad and 10 indicating application is very good. In another example, the additional information may include a purchase data of the application. In this example, the purchase data may include a purchase date, the length of ownership, the last time the user used the application, other purchase data, or combinations thereof.

Figure 9:
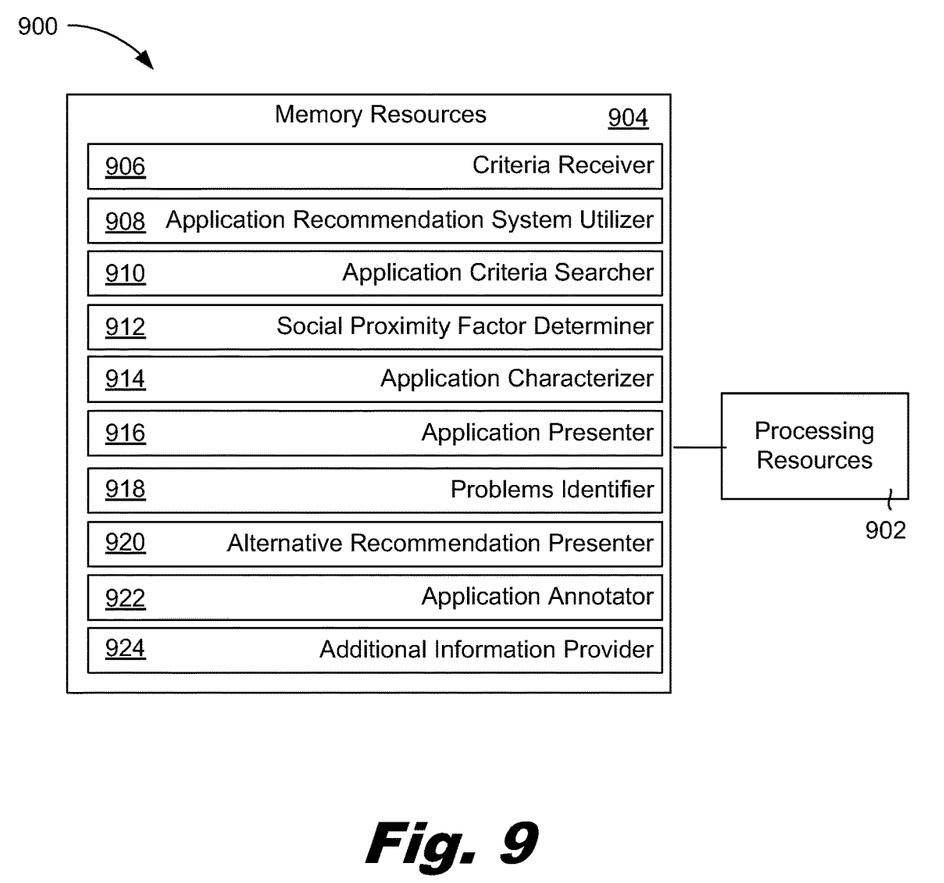
FIG. 9 is a diagram of an example of application recommendation system, according to one example of principles described herein.

FIG. 9 is a diagram of an example of an application recommendation system (900), according to one example of principles described herein. In this example, the application recommendation system (900) includes processing resources (902) that are in communication with memory resources (904). Processing resources (902) include at least one processor and other resources used to process programmed instructions. The memory resources (904) represent generally any memory capable of storing data such as programmed instructions or data structures used by the recommending system (900). The programmed instructions shown stored in the memory resources (904) include a criteria receiver (906), an application recommendation system utilizer (908), an application criteria searcher (910), a social proximity factor determiner (912), an application characterizer (914), an application presenter (916), a problems identifier (918), an alternative recommendation presenter (920), an application annotator (922), and an additional information provider (924).

The memory resources (904) include a computer readable storage medium that contains computer readable program code to cause tasks to be executed by the processing resources (902). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The criteria receiver (906) represents programmed instructions that, when executed, cause the processing resources (902) to receive criteria. The application recommendation system utilizer (908) represents programmed instructions that, when executed, cause the processing resources (902) to utilize an application recommendation system. The application criteria searcher (910) represents programmed instructions that, when executed, cause the processing resources (902) to search application in an application library to meet a criteria. The social proximity factor determiner (912) represents programmed instructions that, when executed, cause the processing resources (902) to determine a social proximity factor to a user. The application characterizer (914) represents programmed instructions that, when executed, cause the processing resources (902) to characterize an application according to a social proximity factor to the user.

The application presenter (916) represents programmed instructions that, when executed, cause the processing resources (902) to present applications ordered by the social proximity factor. The problems identifier (918) represents programmed instructions that, when executed, cause the processing resources (902) to identify problems with the applications. The alternative recommendation presenter (920) represents programmed instructions that, when executed, cause the processing resources (902) to present an alternative recommendation. The application annotator (922) represents programmed instructions that, when executed, cause the processing resources (902) to annotate the application. The additional information provider (924) represents programmed instructions that, when executed, cause the processing resources (902) to provide additional information.

Further, the memory resources (904) may be part of an installation package. In response to installing the installation package, the programmed instructions of the memory resources (904) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (902) and the memory resources (904) are located within the same physical component, such as a server, or a network component. The memory resources (904) may be part of the physical component's main memory, caches, registers, non-volatile memory, or elsewhere in the physical component's memory hierarchy. Alternatively, the memory resources (904) may be in communication with the processing resources (902) over a network. Further, the data structures, such as the libraries, may be accessed from a remote location over a network connection while the programmed instructions are located locally. Thus, the application recommendation system (900)

may be implemented on a user device, on a server, on a collection of servers, or combinations thereof.

The application recommendation system (900) of FIG. 9 may be part of a general purpose computer. However, in alternative examples, the application recommendation system (900) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A computer program product for augmenting a search engine for an application store by utilizing social information from a social media website, comprising:
   a non-transitory computer readable storage medium, said computer readable storage medium comprising computer readable program code embodied therewith, said computer readable program code comprising program instructions that, when executed, causes a processor to:
   receive user input from a user that includes a number of search terms;
   responsive to receiving the user input, search, with the search engine and using the number of search terms, for an application in the application store meeting the number of search terms input by the user and generating a list of applications from the application store meeting the number of search terms input by the user;
   interface the search engine with the social media website to identify any of the applications in the list with which a person who has an established relationship with the user on the social media website has experience;
   determine a social proximity factor between the user and the person or persons with whom the user has an established relationship on the social media website who also have experience with any of the applications in the list, the social proximity factor based at least in part on a frequency of contact between the user and each other person who has experience with any of the applications in the list, wherein the social proximity factor indicates how close is the established relationship between the user and each other person who has experience with that application from the list;
   characterize said applications of the list according to the social proximity factor; and
   determine search results from the list of applications to be presented by the search engine based on the characterization according to the social proximity factor and ordered based on the social proximity factor.

2. The computer program product of claim 1, wherein said number of search terms comprises identification of an individual who is one of the persons with whom the user has an established relationship on the social media website, the instructions further causing the processor to determine search results from the list of applications to present specifically based on which application or applications from the list that the identified individual uses.

3. The computer program product of claim 1, further comprising computer readable program code comprising program instructions that, when executed, causes said processor to present an alternative recommendation responsive to identifying problems with an application on the list.

4. The computer program product of claim 3, wherein said alternative recommendation is based on similarities to said applications on the list.

5. The computer program product of claim 1, wherein said social proximity factor is characterized as a number on a 1 to 10 scale.

6. The computer program product of claim 1, further comprising computer readable program code comprising program instructions that, when executed, causes said processor to annotate said list of applications based on said social proximity factor, an annotation comprising additional information displayed with the list of applications including a picture of the person with whom the user has an established relationship on the social media website that uses a corresponding application in the list and a rating of that corresponding given by that pictured person.

7. The computer program product of claim 1, further comprising computer readable program code comprising program instructions that, when executed, causes said processor to annotate said list of applications, wherein to annotate said list of applications includes displaying an icon of a group making a recommendation regarding one of said applications.

8. The computer program product of claim 7, further comprising computer readable program code comprising program instructions that, when executed, causes said processor to provide additional information from said group about a corresponding application on the list.

9. A system for utilizing social information for recommending an application, said system comprising:
   an application recommendation system comprising a processor, a memory and a network interface for communication with an application store and a social media website,
   said application recommendation system, responsive to a user searching for an application meeting a criteria, configured to utilize:
   a search engine to search for applications in the application store meeting said criteria;
   an application characterization engine to characterize said applications according to a social proximity factor to said user, wherein said proximity factor is determined based on the user's circle of friends on a social media website and whether any of those friends are identified as a user of any of the applications in the application store that is identified as meeting said criteria by said search engine;

an application presentation engine to present a list of said applications ordered by said social proximity factor wherein said application presentation engine presents said applications with a higher social proximity factor before said applications with a lower social proximity factor; and an annotation engine to annotate said list of applications, wherein said annotation engine is to annotate a listing for an application with a picture of a person from the circle of friends who uses that application and any rating of the application provided by that person.

10. The system of claim 9, wherein said search engine is configured to use said application recommendation system to analyze what said user is searching for in an application store based on said criteria said user selects.

11. The system of claim 9, wherein said social proximity factor is characterized by a number on a 1 to 10 scale.

12. The system of claim 9, wherein said application presentation engine is further configured to present a rating for said applications from a group of users.

13. The system of claim 9, wherein said application characterization engine is further configured to analyze said criteria against said social proximity factor.

14. The system of claim 9, further comprising an alternative recommendation engine configured to present an alternative recommendation responsive to identifying problems with said applications wherein said alternative recommendation is based on similarities to said applications.

\* \* \* \* \*